United States Patent [19]

Rinko

[11] Patent Number: 4,872,605
[45] Date of Patent: Oct. 10, 1989

[54] ROLL-OFF SOLDER TIP

[76] Inventor: Kenneth S. Rinko, 518 Crown St., Morrisville, Pa. 19067

[21] Appl. No.: 121,419

[22] Filed: Nov. 16, 1987

[51] Int. Cl.[4] .......................... H01R 43/02; B23K 3/02
[52] U.S. Cl. ......................................... 228/51; 219/230
[58] Field of Search .................. 228/51, 52, 53, 55, 228/179; 219/230; 29/750

[56] References Cited

U.S. PATENT DOCUMENTS

| | | | |
|---|---|---|---|
| 1,495,686 | 5/1924 | Gretz | 228/55 |
| 4,473,181 | 9/1984 | Grabow | 228/51 |

Primary Examiner—Kenneth J. Ramsey
Attorney, Agent, or Firm—Gregory J. Gore

[57] ABSTRACT

A solder tip includes a transfer slot having a shoulder portion for containing a connector pin during heating and soldering. The shape of the slot increases the surface area between the soldering iron and the body of the connector pin to speed heating and shoulder portion permits pressure to be applied to the end of the connector pin during soldering. The slot is further configured to facilitate a roll-off soldering method whereby the solder tip is rotated to lift the connector pin out of the slot after the solder has been applied.

4 Claims, 1 Drawing Sheet

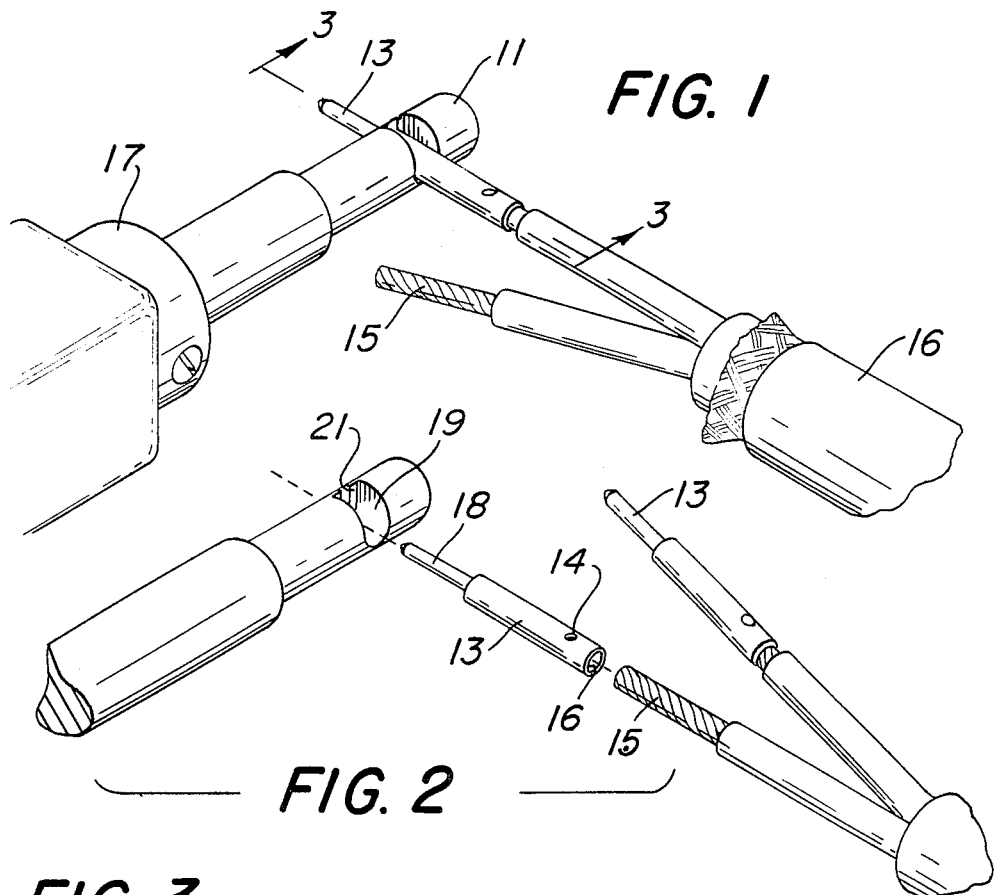
FIG. 1
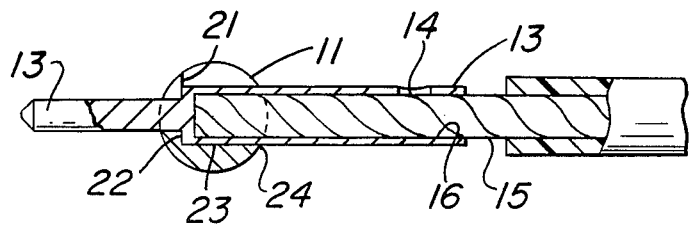
FIG. 2
FIG. 3
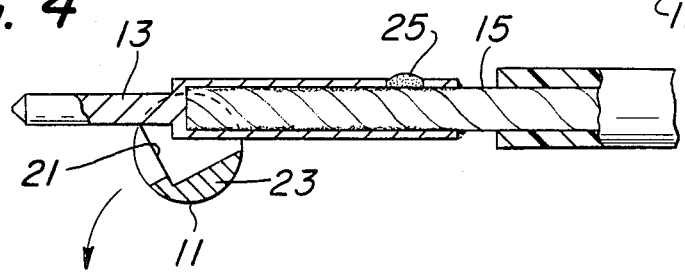
FIG. 5
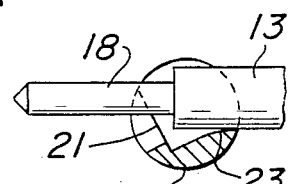
FIG. 4

ROLL-OFF SOLDER TIP

FIELD OF THE INVENTION

This invention relates to apparatus used in soldering. More particularly, this relates to a solder tip used for soldering electrical terminal pins to the ends of wiring.

BACKGROUND OF THE INVENTION

It is well-known that soldering electrical devices is often a delicate and time-consuming process which requires a great deal of skill and dexterity. Electronic components are often either very fragile or very small and require precise heating and metering of solder flow in order to obtain a reliable solder joint. In order to facilitate the soldering process, soldering irons have been fitted with various tips to help control the movement of the article to be soldered. One such attempt is represented by the device disclosed in U.S. Pat. No. 4,473,181 to Grabow, Jr. which discloses a slotted soldering tip which may be used to grip a wire lead while simultaneously applying heat thereto.

One particular soldering operation is particularly tedious and difficult and it has not been addressed in prior art of solder tip manufacture. This process is the application of junction pins to the end of wiring, such as shielded coaxial cable. Once properly soldered in place, the pins represent the male side of a male/female junction connector assembly. This soldering operation is particularly difficult because the pins to be soldered are extremely small and lightweight. They are easily dislodged from the end of the wire during the soldering operation, or when removing the solder tool from the pin after sufficient heat and solder have been applied. It is often the case that when removing the solder tip from the pin, friction between the tip and the pin will cause the pin to be pulled off the end of the wire.

SUMMARY OF THE INVENTION

In order to solve the problem of quickly and efficiently soldering connector pins to the ends of cable wiring, the applicant has devised a unique solder tip configuration which aids both in the controllability of the pin against the wire during soldering including the removability of the solder tip from the pin after soldering. This device comprises a substantially cylindrical solder tip having a transverse U-shaped slot having a shoulder of reduced diameter. The floor of the slot may either be straight or curved to facilitate a related roll-off procedure as will be more fully described herein. In addition to the advantages described above, the slot is dimensioned to provide a close fit with said connector pin thereby greatly increasing the mutual surface area between these parts. Hence, heat flows much more quickly from the solder tip to the connector pin which speeds the soldering process.

Other objects and advantages of the present invention will be more fully understood by the following drawings and description of the preferred embodiment.

BRIEF DESCRIPTION OF THE DRAWINGS

FIG. 1 shows a top perspective view of the present device being used during the wire pin soldering process.

FIG. 2 shows the alignment between the pin connector and the solder tip.

FIG. 3 is a sectional view of FIG. 1 showing the structural cooperation between the solder tip and the connector pin.

FIG. 4 shows the structural relationship between the solder pin and the solder tip when the solder tip is rotated axially.

FIG. 5 shows an alternate embodiment having a slot with a curved floor.

DESCRIPTION OF PREFERRED EMBODIMENT

Referring now to FIG. 1, solder tip 11 is shown engaged with connector pin 13 which is fitted over the end of cable wire 15 being part of the coaxial cable structure 16. Solder tip 11 is secured within soldering iron 17.

Referring now to FIG. 2, solder tip 11 includes a transverse slot 19 which has a reduced width at one end creating U-shape shoulder portion 21. The connector pin 13 includes an elongate nose 18 at one end and socket 16 at the opposite end. Aperture 14 permits introduction of solder material into the connector pin socket 16. As shown in this figure, solder connector pin 13 is inserted transversely into the transverse slot 19 for engagement with the above-described structures of the solder tip.

Referring now to FIG. 3, the connector pin and solder tip are shown in their fully engaged state with the shoulder of connector pin 22 in abutment with solder tip shoulder 21. The solder tip slot includes a floor portion 23 which supports the bottom of connector pin 13. This alignment of components is further supported by the rigidly of cable wire 15 which is fitted within the connector pin socket 16. By these relations, it will be readily understood by those of ordinary skill in the art that pressure transverse to the solder tip may be applied axially to the connector pin in the direction of the wire cable thereby securely holding connector pin 13 over wire end 15. During the soldering process, solder is introduced through aperture 14.

This solder tip device is particularly useful when used in the soldering method as follows. First, the connector pin is inserted over the wire end as depicted in FIG. 2. As shown in FIG. 3, the connector pin is further inserted into said slot until said connector pin shoulder abuts the shoulder far end of the solder tip slot while also being in contacting relation with the floor of the slot. Referring now to FIG. 4, the soldering process having been completed and solder material 25 sufficiently introduced through aperture 14 and around wire structure 15 within the connector pin socket, it is now desired to remove the solder tip from the connector pin to discontinue heating. Using the solder tip structure described above, the operator may simply rotate the solder tip axially through rotation of the solder iron body thereby upwardly moving the edge 24 of slot floor 23 which contacts the bottom of the connector pin. As depicted in FIG. 4, this rotation causes a lifting movement of the connector pin out of the slot. The increased surface area provided by the slot is now greatly reduced as rotation of the solder tip continues. The rotation proceeds until the connector pin is lifted entirely out of the slot and the cylindrical part of the solder tip is in contacting relation with the cylindrical body of the connector pin. This will be appreciated to be a theoretical single point of contact. Once this position has been achieved, the solder tip may be easily slid down the body of the connector pin in the direction of the cable wire and smoothly lifted away from any contact. This solder tip structure and method greatly reduces soldering time and permits a quick and reliable solder connection between the connector pin and wire.

Referring now to FIG. 5, an alternate embodiment of the present device includes a solder tip slot. A slot which has a floor that is curved in relation to the axis of the slot. Floor portion 23 diverges in the direction of the slot end opposite the slot shoulder. Now using this configuration, the connector pin will lift more slowly out of the slot as the tip is rotated. A faster lifting action is provided by the straight floor depicted in FIG. 4.

By these relations, it will be readily understood by those of ordinary skill in the art that the solder tips slot performs many functions. First, it increases the surface area between the tip and the part to be heated, namely the connector pin. Secondly, it allows axial pressure to be applied to the connector pin during the heating and soldering. Thirdly, the structural position of the slot floor provides a lifting point at its outer most edge which raises the connector pin out of the slot when the solder tip is rotated. This rotation disengages the connector pin from the slot and reduces the amount of heat applied due to reduced contact area. Furthermore, the reduced contact area reduces frictional forces between the solder tip and the pin which may otherwise cause the solder tip to be dislodged from the end of the wire when the solder tip is removed.

It should be understood that the above description discloses specific embodiments of the present invention and are for purposes of illustration only. There may be other modifications and changes obvious to those of ordinary skill in the art which fall within the scope of the present invention which should be limited only by the following claims and their legal equivalents.

What is claimed is:
1. A soldering iron tip, comprising:
    a. a substantially cylindrical elongate main body,
    b. a slot located within said main body, said slot being oriented transverse and perpendicular to the axis of said cylindrical main body, and
    c. a reduced width at one end of said slot creating a step and a shoulder within said slot parallel to said axis of said main body.
2. The solder tip of claim 1 further including a slot floor, said floor being substantially semi-circular transverse to its length.
3. The solder tip of claim 2 wherein said slot floor is curved along its axis and diverges in the direction of the slot end opposite said shoulder portion.
4. The method of soldering a connector pin to a wire, comprising the steps of:
    a. inserting over a wire end a connector pin having an elongate nose portion at one end and a socket at the other end for receiving said wire,
    b. inserting an elongate nose portion of said connector pin into a slot in a soldering iron tip, said tip slot having a semi-circular floor and being oriented transverse to the axis of the solder tip,
    c. further inserting the connector pin into said slot until a connector pin shoulder abuts said floor and a shoulder at the far end of said solder tip slot,
    d. applying solder to said connector pin,
    e. rotating said solder tip in a direction away from the end of said connector pin thereby lifting said connector pin out of said slot, and
    f. withdrawing said solder tip from said connector pin.

* * * * *